(12) United States Patent
Zucker et al.

(10) Patent No.: US 10,439,979 B2
(45) Date of Patent: Oct. 8, 2019

(54) MESSAGING INTEGRATION

(71) Applicant: NCR Corporation, Duluth, GA (US)

(72) Inventors: Brent Vance Zucker, Roswell, GA (US); Robert Andrew Kingslyn, San Diego, CA (US); Yehoshua Zvi Licht, Alpharetta, GA (US)

(73) Assignee: NCR Corporation, Atlanta, GA (US)

( * ) Notice: Subject to any disclaimer, the term of this patent is extended or adjusted under 35 U.S.C. 154(b) by 155 days.

(21) Appl. No.: 15/251,675

(22) Filed: Aug. 30, 2016

(65) Prior Publication Data

US 2018/0063070 A1    Mar. 1, 2018

(51) Int. Cl.
*G06F 15/16* (2006.01)
*H04L 12/58* (2006.01)

(52) U.S. Cl.
CPC .......... *H04L 51/36* (2013.01); *H04L 51/02* (2013.01); *H04L 51/046* (2013.01); *H04L 51/066* (2013.01); *H04L 51/16* (2013.01)

(58) Field of Classification Search
None
See application file for complete search history.

(56) References Cited

U.S. PATENT DOCUMENTS

| | | | |
|---|---|---|---|
| 2013/0055099 A1* | 2/2013 | Yao | G06Q 10/101 715/739 |
| 2015/0319120 A1* | 11/2015 | Hull | H04L 51/18 709/206 |
| 2017/0180276 A1* | 6/2017 | Gershony | H04L 51/02 |

\* cited by examiner

*Primary Examiner* — Padma Mundur
(74) *Attorney, Agent, or Firm* — Schwegman, Lundberg & Woessner (57) ABSTRACT

A dialog for a chat session spans multiple messaging platforms. Bots participate in each messaging platform for maintaining an aggregated and integrated view of the session across the multiple messaging platforms.

19 Claims, 5 Drawing Sheets

MESSAGING INTEGRATION

BACKGROUND

Individuals and businesses utilize a variety of messaging technologies to: socialize, communicate, and engage in business activities. Some of these messaging technologies include: email platforms, text platforms, instant messaging platforms, browser-based platforms, and a variety of social media platforms. Each specific type of messaging platform has its own set of interfaces and features, some of which may be device-type specific or may work better (with more features) on a given device type. Furthermore, most messaging platforms include their own Application Programming Interfaces (APIs) that permit automated and program-based interaction with features of the messaging platforms.

As a result, businesses have little useful metrics as to how consumers are using messaging platforms to engage in activities with the businesses beyond direct interactions between an individual and a business over a specific messaging platform. The problem with this is that the messaging activity by an individual prior to that individual engaging a business is essentially unknowable with present technology and technology approaches.

For example, consider a consumer who receives a discount at a restaurant through normal mail delivered to a home address of the consumer or delivered via email (type of messaging platform) to an email address of the consumer. The consumer may then redeem the discount online when ordering for a group of friends. Subsequently, the consumer picks up the food order from the restaurant. The restaurant has no idea as to: who the group of friends were (identities of members), what relationship each member has to the consumer, nor how the consumer reached out to the members for establishing the group food order in the first place. Moreover, the consumer has no existing messaging platform for collecting contributions from each member of the group to obtain what that member owes for that member's portion of the food order (except for the consumer specifically prompting each member with what that member owes and manually collecting from each member his/her share).

A business only sees a small portion of a consumer's journey (activity from start to finish) that leads to business engagement through messaging technology. The journey can span multiple different messaging platforms, and the journey is rich with metrics that would permit the business to better engage, market, and understand the consumer and the consumer's journeys.

SUMMARY

In various embodiments, methods and a system for messaging integration are presented.

According to an embodiment, a method for messaging integration is provided. Specifically, a message is received when received over a messaging platform. Next, an action is identified from the message. Finally, the action is performed so as to affect a second messaging platform.

DETAILED DESCRIPTION

Figure 1A:
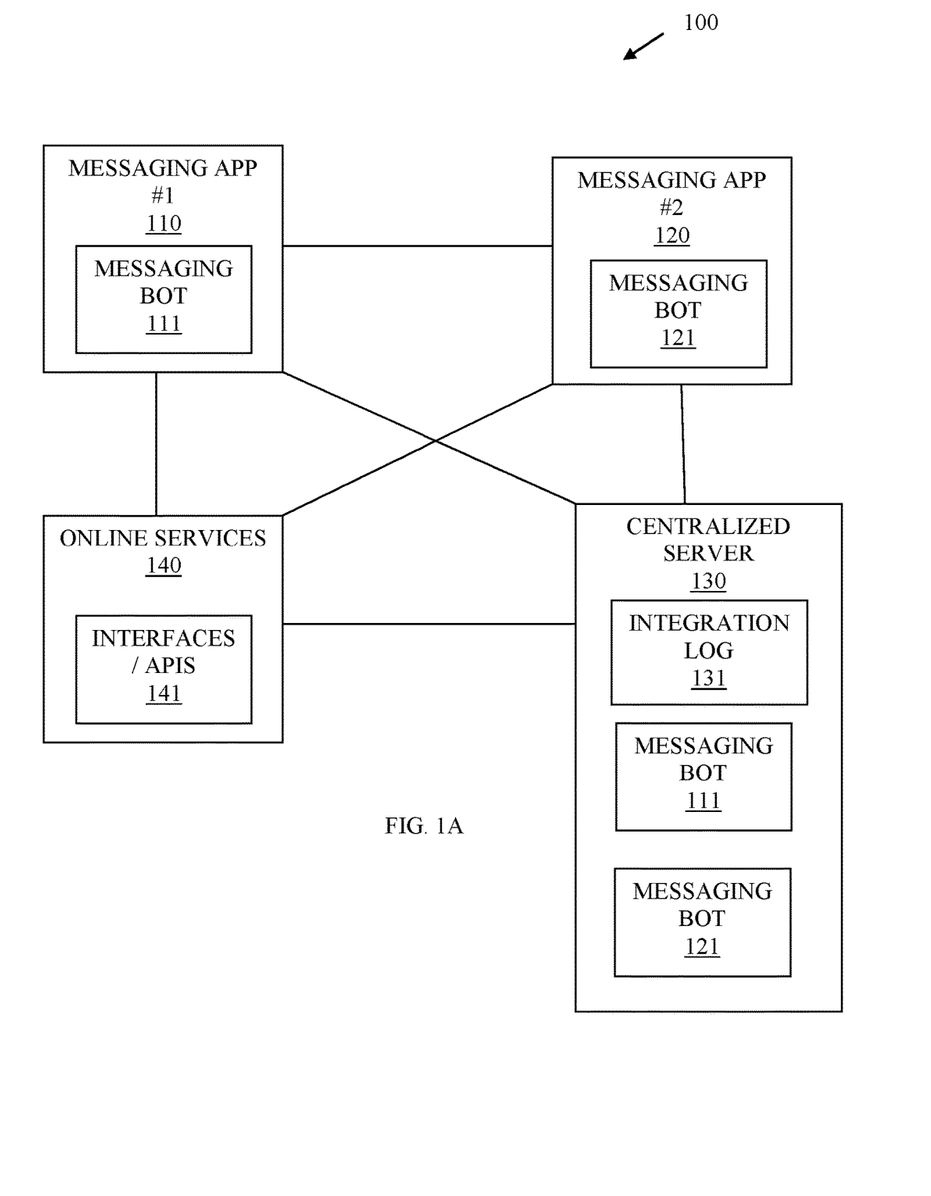
FIG. 1A is a diagram of a system for messaging integration, according to an example embodiment.

FIG. 1A is a diagram of a system 100 for messaging integration, according to an example embodiment. The system 100 is shown schematically in greatly simplified form, with only those components relevant to understanding of one or more embodiments (represented herein) being illustrated. The various components are illustrated and the arrangement of the components is presented for purposes of illustration only. It is to be noted that other arrangements with more or less components are possible without departing from the messaging integration techniques presented herein and below.

Moreover, various components are illustrated as one or more software modules, which reside in non-transitory storage and/or hardware memory as executable instructions that when executed by one or more hardware processors perform the processing discussed herein and below.

The techniques, methods, and systems presented herein and below for messaging integration can be implemented in all, or some combination of the components shown in different hardware computing devices having one or more hardware processors.

The system 100 includes: 1) a first messaging app #1 110 (app refers to "application" herein) having access or a means for reaching a messaging bot 111, 2) a second messaging app #2 120 having access or a means for reaching messaging bot 121, 3) a centralized server 130 having an integration log 131 and 4) a plurality of online services 140 having interfaces/APIs 141.

The messaging apps 110 and 120 process on processor-enabled devices, such as but not limited to: a desktop computer, a laptop computer, a mobile phone, a tablet, a wearable processing device (watch, goggles, etc.), an intelligent appliance (light switch, lamp, garage door opener, refrigerator, television, stereo, etc.), etc.

In an embodiment, the messaging app #1 110 and the messaging app #2 process on a same device.

In an embodiment, the messaging app #1 110 and messaging app #2 process on separate and different independent devices.

In an embodiment, the device that is processing messaging app #1 110 is operated by a first user while a second user operates a device that is processing messaging app #2 120.

In an embodiment, the device that is processing messaging app #1 110 is operated by a same user that operates a device that is processing messaging app #2 120.

In an embodiment, messaging app #1 110 is for user interaction over a first messaging platform whereas messaging app #2 120 is for user interaction over a second messaging platform. The first and second messaging platforms are disparate and different from one another.

As used herein, a "messaging platform" refers to the software, interfaces, APIs, and network connectivity used to perform messaging communications by users. A messaging platform includes, by way of example only, email, Short Message Service (SMS) text, instant message, and social-media applications (e.g., Facebook™, Slack™, Twitter™, Instagram™, Snap Chat™, LinkedIn™, etc.).

As used herein, a "messaging bot" refers to a software application that is designed to engage in messaging activities in an automated manner as an active or passive participant within a specific messaging platform. A messaging bot is a logical participant in a given chat session (messaging session). Moreover, a messaging bot is configured to perform a variety of configured automated actions within its messaging platform and outside its messaging platform.

In an embodiment, the messaging app (110 and/or 120) includes no software changes or modifications for its corresponding messaging bot (111 and/or 121) to be operational and perform the processing discussed herein and below. That is, from the perspective of the messaging platform and the messaging app (110 and/or 120), the messaging bot (111 and/or 121) is a real user or participant (albeit the bot (111 and/or 121) is a logical participant.

In an embodiment, it is to be noted that the bots (111 and 121) need not process on a same device as the corresponding messaging app (110 and 120). So, all a user operating messaging app #1 110 need do is identify a participant of a chat session (initiated with messaging app #1 110) as being messaging bot 111. The actual device that executes the messaging bots 111 and 121 can be the centralized server 130 and/or a completely different server separate from the centralized server 130 (not shown in the FIG. 1A).

In some embodiments, the messaging bots 111 and 121 may process within the local processing contexts and on the devices that process the corresponding messaging apps 110 and 120, respectively.

One benefit by retaining the messaging-specific bots 111 and 121 in the centralized server 130 is that any updates and enhancements to the bots 111 and 120 can be achieved without updates to the devices having the messaging apps 110 and 120. Furthermore, a single base version of the bots 111 and 121 can exist on the server 130 and support multiple disparate users through use of user-customization profiles that include user-specific configurations of the bots 111 and 121. In this manner, when a specific user identifies a bot 111 or 121 in a messaging app 110 or 120, respectively, the centralized server can cause the base bot to be initiated and apply the that user's specific preferences/configurations to create a running instance of the bot 111 and/or 121.

During operation, a user operating a device activates messaging app #1 110 to initiate a chat session and identifies at least one other participant for that chat session. When the chat session only includes one additional participant beyond the user, that single additional participant is identified by the user as bot 111.

Assume for an example that the user selects at least 4 additional participants for the initiated chat session: bot 111, Brent, Robbie, and Shuki. In an initial message of the chat session including these participants through an SMS text messaging platform, the user sends a message to these participants asking who wants to contribute on a wedding gift at Target® for a bride and groom they all know to buy them what was identified as an item on their bridal registration list with Target®.

The bot 111 receives the same text message as a participant on the server 130. The bot 111 parses the received message to identify that the sender is Joe and that the participants being asked the question are Brent, Robbie, and Shuki. The bot 111 also parses the body of the text message for key words such as: "buy, contribute, bride and groom, bridal registration, item, target." The original text message may or may not be recorded in the integration log 131. The bot also notes in the integration log potential actions that the bot 111 may need to perform during the chat session, such as purchase the item at Target® using Target's® online service 140 and APIs 141 on behalf of Joe; maintain which of the participants that respond and how much they want to contribute.

Suppose further that Shuki and Brent respond to the group chat indicating that they will contribute X and Y amount, while Robbie responds no thanks I already got them something. Because the bot 111 is an active participant in this group chat, the bot 111 notes in the integration log 131 for the chat session (discoverable in the log 131 through a unique chat session identifier and perhaps Joe's identity) the following (as an example): "Shuki—Yes—$X, Brent—Yes—$Y. Robbie—No."

Now suppose, sometime has passed and Joe completely forgets who responded with what and other chat sessions were occurring such that Joe's chat log for the responses are no longer available or no longer easily obtainable by Joe. Joe can send a SMS message to the bot 111 and ask: Who is in and for how much for the wedding gift. The bot 111 parses the received message and can locate in the log the appropriate entries (using the original chat session identifier or using Joe's identity and/or keywords in the message Joe sends to bot 111). The bot 111 can then respond to Joe with a text message in natural language that inserts specific details from the log into the message with a response such as: "Shuki wants to contribute $X, Brent wants to contribute $Y, and Robbie indicated he already got them something."

In response, to the bot 111 message, Joe responds okay let's purchase item and collect the funds from Shuki and Brent. The bot 111 receives this message and again parses it to identify two actions, purchase item, and collect from Shuki and Brent. The Bot 111 then sends a message or messages to Shuki and Brent indicating that Joe is buying and wants $X and $Y for the item. Shuki and Brent respond with messages back to the bot 111 with in a variety of manners, such as by identifying a credit/debit/gift card number for use, identifying a registered account held by them and registered with the bot 111, etc.

The bot 111 receives the messages back from Shuki and Brent and parses to identify the method of payments. A message may also be sent to Joe by the bot 111 requesting $Z based on the bot 111 interacting with Target's® online services 140 and API 141 to discover the price of the item and calculating that Joe needs $Z with Suki's $X and Brent's $Y to obtain the item price required by Target®. Joe responds with a message to the bot 111 identifying a method of payment for $Z. Once the bot 111 has all the methods of payments, the bot 111 interacts with the online services 140 of Target® and the APIs® to order item for the bride and groom wedding registry and provides the methods of payments (which identify to Target® (because of the names associated with the methods of payment): Joe, Shuki, and Brent. One the purchase is completed, the bot 111 sends a message to Joe, Shuki, and Brent indicating the item was purchased and provides the receipt details.

Shipping or pickup of the item can be done in a similar automated fashion between the bot 111, and the messaging apps 110 and 120 for Joe, Brent, and Shuki. During each interaction of the chat session, the bot 111 retains details of a message and actions taken along with other metadata (date and time, etc.) in the integration log 131. The log 131 can be processed by the bot 111 to perform a variety of post chat operations, such as replaying the chat session for a participant (activated with a natural language requested by the participant with a message sent to the bot 111), metrics for multiple different chat sessions based on a retailer identifier (such as Target's® identifier in the present example), metrics for multiple different chat sessions based on a single user identifier or a selected set of users (Joe, Brent, Shuki, and/or Robbie in the present example), and others.

In fact, the bots 111 and 121 can be configured for performing a variety of automated operations based on natural language processing.

Additionally, the participants in the example chat session may use a different messaging app 120, such as Shuki preferring to use email in responses when he see initial text messages regarding the chat session. In such a case, bot 121 is activated as a participant by Shuki in replies and bot 121 records message details in the integration log 131 for which message bot 111 has access and can react to information recorded by bot 121 for Shuki in the log 131 when responding to Joe and Brent over SMS text messages for messaging app 110. In this way, the bots 111 and 121 can be used for integrating a chat session across multiple different messaging platforms and apps 110 and 120, respectively, through the integration log 131.

In an embodiment, the messaging app 110 in the previous example is voice-enabled and bot 111 performs voice analysis to identity actions and requests for actions in voice messages provided by Joe. So, Joe may be driving and send an SMS text message back to the bot 111 as a voice message. In an embodiment, the bot 111 can respond back to Joe through a voice message only, a text message only, or both a voice message and a text message.

So, the bots 111 and 121 permit cross and disparate messaging platform integration for a chat session and can support different forms of media (voice, text, email, social-media posts, instant messages, etc.) associated with messages during the chat session.

The system 100 illustrates that a "journey" actions or activities taken by a user/consumer across multiple messaging platforms to achieve some desired result (such as purchasing an item, organizing an event, splitting expenses among a group, etc.). The bots 111 and 121 combined with the integration log 131 permits an aggregated view of the actions and activities across those multiple messaging platforms for the journey. Moreover, the bots 111 and 121 permit automated actions to be performed during the journey. The aggregated view may be viewed as a normalized dialogue for the journey, which through the bots 111 and 121 can be presented, summarized, and interacted with through any messaging platform. Still further, retailers can be provided the aggregated views for journeys for purposes of better understanding, servicing, and marketing to their customers.

In an embodiment, a messaging app 110 and/or 120 is a voice enabled automated voice service, such as but not limited to: Siri® provided by Apple® or Echo® provided by Amazon®.

Figure 1B:
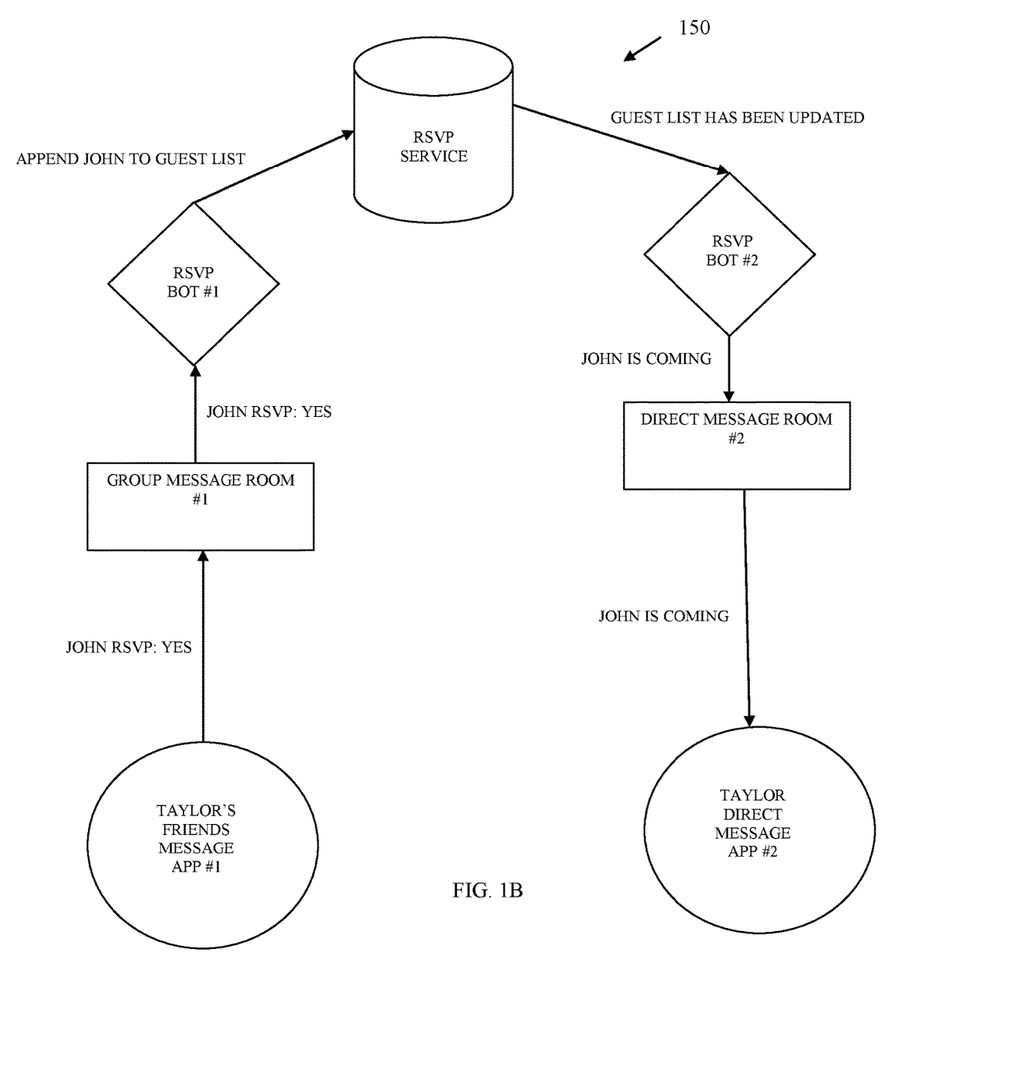
FIG. 1B is a diagram of a sample processing scenario for messaging integration, according to an example embodiment.

The FIG. 1B is now discussed with another example scenario for messaging integration, according to an example embodiment.

The example assumes that a social-media chat room is used by participants of a group that were invited through the chat room to a party requiring RSVP. Taylor initiated the group message room #1 by inviting people to her party. Taylor's friend, uses the social-media app #1 interface for the group message room #1 to RSVP for the party. The RSVP Bot #1 detects the posting posing in the group message room #1 because bot #1 is a registered participant (as discussed above). The bot #1 parses Taylor's friend's message to identify the posting as being John who has RSVP. Bot #1 then uses an API to an online RSVP service to add John to the list of participants attending the party. Bot #2 detects that the online RSVP has been updated and uses an API to discover that John RSVP to the party. Bot #2 then sends a natural language message as an SMS text through direct message room #2 application interface indicating to Taylor that John is coming to the party. The text message app #2 used on Taylor's phone provides a notification on the phone that John is coming.

This illustrates how social media chatrooms can be integrated with an online service and a different messaging app (SMS text) to provide notifications that cross messaging platforms and to automatically integrate with on online system. Again, this is achieved through the bots 111 and 121 and the integration log 131 as discussed in detail above with the FIG. 1A.

A variety of situations can be achieved with the bots 111 and 121 and the integration log 131 processing techniques. For example, journeys can be merged to split expenses (as discussed in the FIG. 1A), recommendations for services or products shared, reservations made, events organized, items purchased, arranging group airline tickets or sporting event tickets with seat selections for the group, sharing or distributing retail promotions, and others. Moreover, an individual can split from a merged journey (dialogue) and continue along with his own journey (dialogue), such as when an individual participates in a group aggregated cross-messaging platform dialogue to obtain plane tickets but once in the plane buys drinks and food not associated with the group.

The embodiments presented in the FIGS. 1A-1B and other embodiments are now discussed with reference to the FIGS. 2-4.

Figure 2:
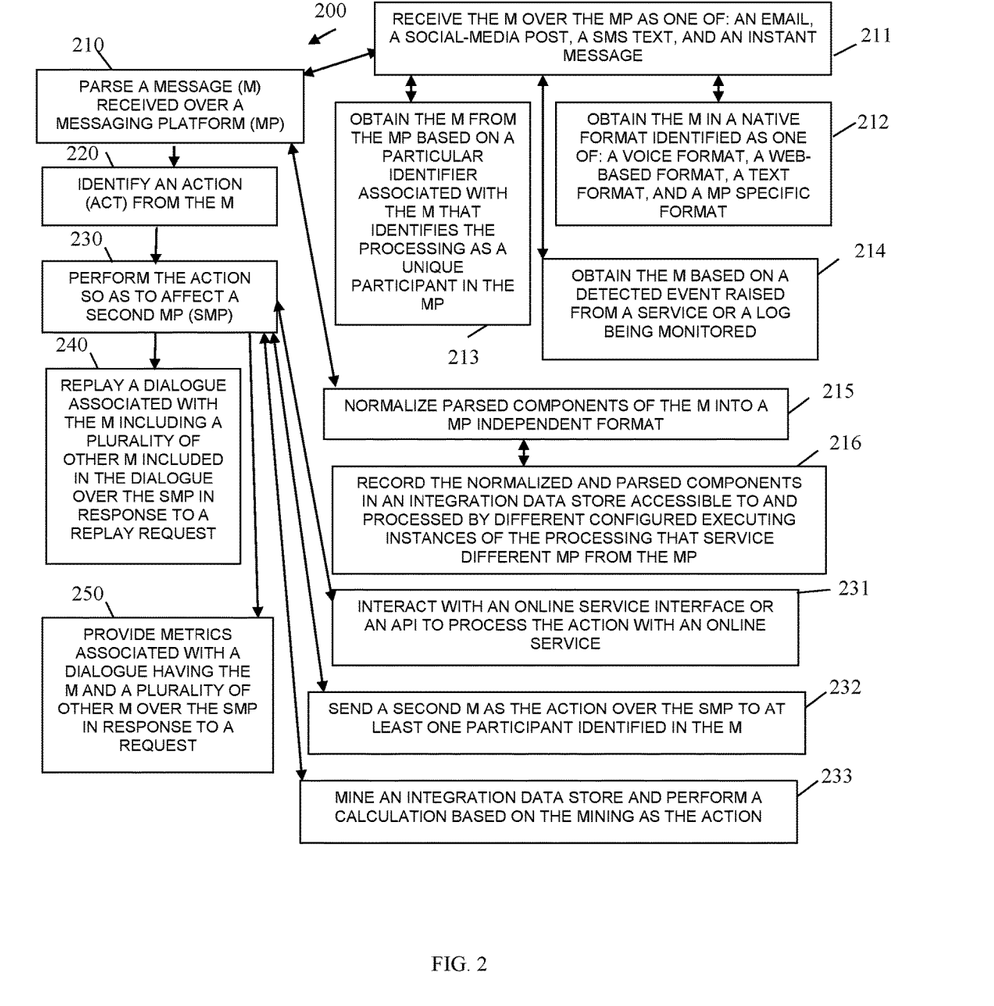
FIG. 2 is a diagram of a method for messaging integration, according to an example embodiment.

FIG. 2 is a diagram of a method 200 for messaging integration, according to an example embodiment. The software module(s) that implements the method 200 is referred to as a "messaging integrator." The messaging integrator is implemented as executable instructions programmed and residing within memory and/or a non-transitory computer-readable (processor-readable) storage medium and executed by one or more hardware processors of a hardware computing device. The processors of the device that executes the messaging integrator are specifically configured and programmed to process the messaging integrator. The messaging integrator has access to one or more networks during its processing. The networks can be wired, wireless, or a combination of wired and wireless.

In an embodiment, the device that executes the messaging integrator is the device or set of devices that process in a cloud processing environment.

In an embodiment, the device that executes the messaging integrator is the server 130.

In an embodiment, the device that executes the messaging integrator is a device operated by a user, such as one of a desktop computer, a laptop computer, a tablet, a watch, goggles, and an intelligent processor-enabled appliance.

In an embodiment, the messaging integrator is the bot 111 and/or the bot 121.

At 210, the messaging integrator parses a message received over a messaging platform or obtained from the messaging platform.

According to an embodiment, at 211, the messaging integrator receives the message over the messaging platform as one of: an email, a social-media post, a SMS text, and an instant message.

In an embodiment of 211 and at 212, the messaging integrator obtains the message in a native format identified as one of: a voice format, a web-based format, a text format, and a messaging-platform specific format.

In an embodiment of 211 and at 213, the messaging integrator obtains the message from the messaging platform based on a particular identifier associated with the message that identifies the messaging integrator as unique participant in the messaging platform and a dialogue associated with the message.

A "dialogue" (as used herein) refers to multiple messages that span multiple messaging platforms and is associated with a single logical chat session or topic.

In an embodiment of 211 and at 214, the messaging integrator obtains the message based on a detected event raised from a service or a log being monitored. In an embodiment, the log is the integration log 131. In an embodiment the service is the online service 140.

In an embodiment, at 215, the messaging integrator normalizes parsed components of the message into a messaging-platform independent format.

In an embodiment of 215 and at 216, the messaging integrator records the normalized and parsed components in an integration data store accessible to and processed by different configured executing instances of the messaging integrator that services different messaging platforms from the messaging platform.

At 220, the messaging integrator identifies an action from the message. This can be done by mapping words identified in the message to a specific action that the messaging integrator is to perform.

At 230, the messaging integrator performs the action as to affect a second messaging platform. That is, and by way of one example, the action may write to the integration log 131, which causes a different message to be sent by a different instance of the messaging integrator over the second messaging platform.

According to an embodiment, at 231, the messaging integrator interacts with an online service interface or an API to process the action with the online service. In an embodiment, the online service is the online service 140 and the online service interface/API is 141.

In an embodiment, at 232, the messaging integrator sends a second message as the action over the second messaging platform to at least one participant identified in the message.

In an embodiment, at 233, the messaging integrator mines an integration data store and performs a calculation based on mining as the action. So, the action may result in gathering metrics from integration log 131 and performing a calculation.

According to an embodiment, at 240, the messaging integrator replays a dialogue associated with the message (and the dialogue including other messages) over the second messaging platform in response to a replay request sent in a different message to the messaging integrator.

In an embodiment, at 250, the messaging integrator provides metrics associated with a dialogue having the message and a plurality of other messages over the second messaging platform in response to a request sent in a different message to the message integrator.

Figure 3:
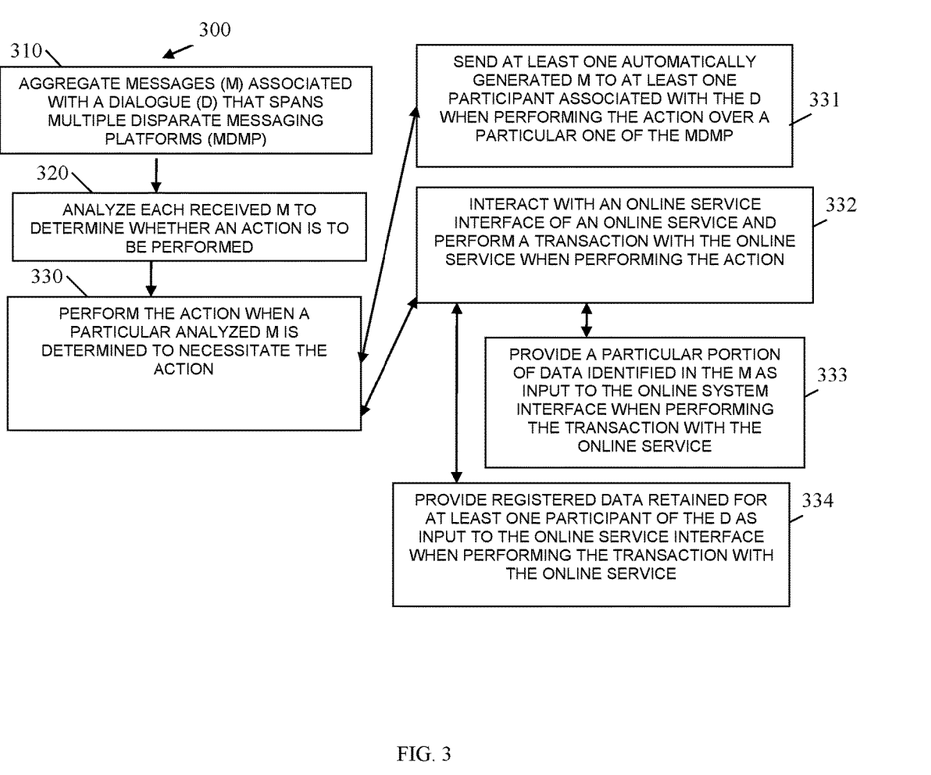
FIG. 3 is a diagram of another method for messaging integration, according to an example embodiment.

FIG. 3 is a diagram of another method 300 for messaging integration, according to an example embodiment. The software module(s) that implements the method 300 is referred to as a "messaging bot." The messaging bot is implemented as executable instructions programmed and residing within memory and/or a non-transitory computer-readable (processor-readable) storage medium and executed by one or more hardware processors of a hardware device. The processors of the device that executes the messaging bot are specifically configured and programmed to process the messaging bot. The messaging bot has access to one or more networks during its processing. The networks can be wired, wireless, or a combination of wired and wireless.

The messaging bot presents another and in some ways enhanced perspective of the messaging integrator for the method 200.

In an embodiment, the messaging bot is the method 200.

In an embodiment, the messaging bot is the bot 111 and/or 121.

In an embodiment, the device that executes the messaging bot is the server 130.

In an embodiment, the device that executes the messaging bot is a cloud processing environment.

In an embodiment, the device that executes the messaging bot is a device operated by a user, such as but not limited to: a desktop computer, a laptop computer, a tablet, a watch, goggles, and an intelligent processor-enabled appliance.

At 310, the messaging bot aggregates messages associated with a dialogue that spans multiple disparate messaging platforms.

At 320, the messaging bot analyzes each received message to determine whether an action is to be performed.

At 330, the messaging bot performs the action when a particular analyzed message is determined to necessitate the action.

In an embodiment, at 331, the messaging bot sends at least one automatically generated message to at least one participant associated with the dialogue when performing the action over a particular one of the multiple disparate messaging platforms.

In an embodiment, at 332, the messaging bot interacts with an online service interface of an online service and performs a transaction with the online service when performing the action.

In an embodiment of 332 and at 333, the messaging bot provides a particular portion of data identified in the message as input to the online system interface when performing the transaction with the online service.

In an embodiment of 332 and at 334, the messaging bot provides registered data retained for at least one participant of the dialogue as input to the online service interface when performing the transaction with the online service.

Figure 4:
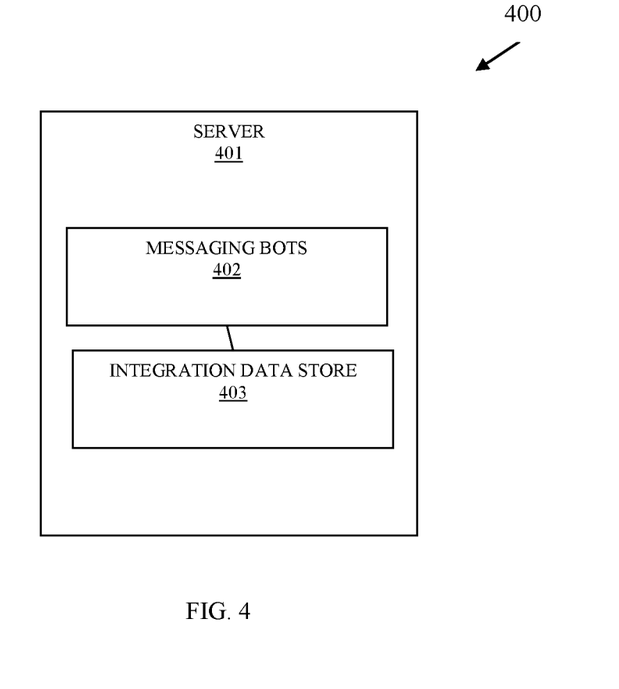
FIG. 4 is a diagram of a messaging integration system, according to an example embodiment.

FIG. 4 is a diagram of a messaging integration system 400, according to an example embodiment. The system 400 includes a variety of hardware components and software components. The software components of the system 400 are programmed and reside within memory and/or a non-transitory computer-readable medium and execute on one or more hardware processors of a hardware device. The system 400 communicates one or more networks, which can be wired, wireless, or a combination of wired and wireless.

In an embodiment, the system 400 implements all or some combination of the processing discussed above with the FIGS. 1A-1B and 2-3.

In an embodiment, the system 400 implements, inter alia, the method 200 of the FIG. 3.

In an embodiment, the system 400 implements, inter alia, the method 200 of the FIG. 2.

The system 400 includes a server 401 and the server including a plurality of messaging bots 402 and an integration data store 403.

In an embodiment, the server 401 is the server 130.

In an embodiment, the messaging bots 402 are one or more of: bot 111, bot 121, the method 200, and the method 300.

In an embodiment, the integration data store 403 is the integration log 131.

In an embodiment, the integration data store 403 is a relational database table.

In an embodiment, the integration data store 403 is a custom-defined data structure.

In an embodiment, the integration data store 403 is a single file.

In an embodiment, the integration data store 403 is a plurality of files.

In an embodiment, the integration data store 403 is a directory.

In an embodiment, the integration data store is a web page.

Each messaging bot 402 is configured to: execute on at least one hardware processor of the server 401, actively participate as a participant in a dialogue that spans multiple disparate messaging platforms over a specific messaging platform, aggregate and normalize messages received over the specific messaging platform within the integration data store 403, and perform actions identified from the integration data store 403.

In an embodiment, each messaging bot 402 is further configured to receive particular ones of the messages over the specific messaging platform in: a voice format, a text format, a web-based format, and a format specific to the specific messaging platform for which that messaging bot is an active participant.

In an embodiment, at least one messaging bot 402 is further configured to: interact with on online service interface of an online service to perform a transaction with the online service in furtherance of the dialogue. In an embodiment, the online service is the online service 140. In an embodiment, the online service interface is the online service interface 141.

In an embodiment, the system 400 includes specialized bots 402 configured to perform transactions and interact with online services and online service interfaces. The specialized bots 402 are activated based on changes recorded in the integration data store 403.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:

parsing, by executable instructions from a non-transitory computer readable storage medium that execute on a hardware processor as a messaging integrator, a message received over a messaging platform, wherein parsing further includes obtaining the message from the messaging platform using a participant identifier that is associated with the message, and wherein the participant identifier identifies the messaging integrator as a unique participant in the messaging platform;

acquiring, by the messaging integrator, a stored dialogue that is associated with the message and is acquired from an integration log captured for a dialogue, wherein the integration log is specific to the dialogue;

identifying, by the messaging integrator, an action from the message by mapping words identified in the message to a specific action being requested in the message using the integration log and natural language processing;

automatically performing, by the messaging integrator, the action, wherein automatically performing further includes at least sending a second message to a second messaging platform based on the integration log; and processing the messaging integrator as an active participant of the dialogue based on the participant identifier that is associated with the message.

2. The method of claim 1, wherein parsing further includes receiving the message over the messaging platform as for one of: an email, a social-media post, a Short Message Service (SMS) text, and an instant message.

3. The method of claim 2, wherein receiving further includes obtaining the message in a native format identified as one of: a voice format, a web-based format, a text format, and a messaging-platform specific format.

4. The method of claim 2, wherein receiving further includes obtaining the message based on a detected event raised from a service or a log being monitored.

5. The method of claim 1, wherein parsing further includes normalizing parsed components of the message into a messaging-platform independent format.

6. The method of claim 5 further comprising, recording, by the messaging integrator, the normalized parsed components in the integration log accessible to and processed by different configured executing instances of the messaging integrator that service different messaging platforms from the messaging platform.

7. The method of claim 1, wherein automatically performing further includes interacting within an online service interface or an Application Programming Interface to process the action with an online service.

8. The method of claim 1, wherein automatically performing further includes sending the second message as the action over the second messaging platform to at least one participant identified with the message.

9. The method of claim 1, wherein automatically performing further includes mining the integration log and performing a calculation based on the mining as the action.

10. The method of claim 1 further comprising, replaying, by the messaging integrator, the dialogue associated with the message including a plurality of other messages included in the dialogue over the second messaging platform in response to a replay request using the integration log.

11. The method of claim 1 further comprising, providing, by the messaging integrator, metrics associated with the dialogue having the message and a plurality of other messages over the second messaging platform in response to a request using the integration log.

12. A method, comprising:
aggregating, by executable instructions from a non-transitory computer readable storage medium that execute on a hardware processor as a messaging bot, messages in a stored dialogue, wherein the messages are associated with a dialogue that spans multiple disparate messaging platforms and the messages are aggregated and stored for the dialogue in an integration log that is specific to the dialogue as the stored dialogue, wherein aggregating further includes identifying from at least one of the messages a participant identifier associated with the messaging bot, wherein the messaging bot is a unique participant in at least one of the messaging platforms;
analyzing, by the messaging bot, the integration log for each received message to determine whether an action is to be performed based on words identified within that message that map to a specific action using the integration log and natural language processing;
automatically performing, by the messaging bot, the action when a particular analyzed message is determined to necessitate the action based on the integration log, wherein automatically performing includes sending at least one second message, by the messaging bot, during and within the dialogue, wherein the at least one second message is directed to a particular messaging platform; and
processing the messaging bot as an active participant of the dialogue with the messaging bot identified by the unique participant identifier from the at least one of the messages.

13. The method of claim 12, wherein automatically performing further includes sending at least one automatically generated message to at least one participant associated with the dialogue when performing the action over a particular one of the multiple disparate messaging platforms.

14. The method of claim 12, wherein automatically performing further includes interacting with an online service interface of an online service and performing a transaction with the online service when performing the action.

15. The method of claim 14 wherein interacting further includes providing a particular portion of data identified in the aggregated messages as input to the online service interface when performing the transaction with the online service.

16. The method of claim 14, wherein interacting further includes providing registered data retained for at least one participant of the dialogue as input to the online service interface when performing the transaction with the online service.

17. A system, comprising:
a processor;
at least one hardware processor;
a non-transitory computer readable storage medium having executable instructions that execute on the at least one hardware processor, the executable instructions representing messaging bots;
the messaging bots; and
an integration log stored in a data store;
wherein each messaging bot is executed by the at least one hardware processor from the non-transitory computer-readable storage medium causing the at least one hardware processor to:
participate as an active participant in a dialogue that spans multiple disparate messaging platforms based at least on one messaging bot being identified as the active participant, through a unique participant identifier included with at least one message of the dialogue within a specific messaging platform during the dialogue;
aggregate and normalize messages received over the multiple disparate messaging platforms specific messaging platform within the integration log, wherein the integration log is specific to the dialogue and the integration log is maintained as a stored dialogue for the dialogue;
automatically perform actions identified from the stored dialogue based on words identified from the messages, wherein the words are mapped to specific actions using natural language processing and using the stored dialogue; and
send at least one message within and during the dialogue that is directed to at least one of the multiple disparate messaging platforms.

18. The system of claim 17, wherein the at least one hardware processor is further caused to:
receive particular ones of the messages over the multiple disparate messaging platforms in: a voice format, a text format, a web-based format, and a format that is specific to the specific messaging platform for which that messaging bot is the active participant.

19. The system of claim 18, wherein the at least one hardware processor is further caused to:
interact with a second messaging bot through an online service interface of an online service to perform a transaction with the online service in furtherance of the dialogue.

* * * * *